United States Patent [19]

Pitesky

[11] 4,225,440
[45] Sep. 30, 1980

[54] FILTER HOLDING ASSEMBLY

[76] Inventor: Isadore Pitesky, 4001 Linden Ave., Long Beach, Calif. 90806

[21] Appl. No.: 14,733

[22] Filed: Feb. 23, 1979

[51] Int. Cl.² .................... B01D 27/08; B01D 31/00
[52] U.S. Cl. ............................ 210/321 R; 210/346; 210/436; 210/441; 210/445; 210/447; 210/451; 210/453; 210/472
[58] Field of Search ................. 210/188, 257 M, 302, 210/321 R, 335, 339, 349, 433 M, 435, 436, 441, 446, 447, 449, 450, 451, 453, 455, 460, 472, 346, 486, 445, 487; 422/99, 104; 55/158, 482, 493, 499, 501, 502, 503, 511; 251/351

[56] References Cited

U.S. PATENT DOCUMENTS

| | | | |
|---|---|---|---|
| 2,045,379 | 6/1936 | Bennett | 55/158 |
| 2,879,207 | 3/1959 | Poitras | 210/446 |
| 3,059,821 | 10/1962 | Kubiuvnas | 251/351 |
| 3,398,088 | 8/1968 | Okey | 210/15 |
| 3,556,302 | 1/1971 | Agranat | 210/321 R |
| 3,768,661 | 10/1973 | Coates | 210/449 |
| 3,909,218 | 9/1975 | Kumura et al. | 55/158 |
| 4,016,896 | 4/1977 | Oikarinen | 137/205 |
| 4,082,668 | 4/1978 | Zeiweh et al. | 210/129 |
| 4,136,029 | 1/1979 | Cosack et al. | 10/242 R |
| 4,155,247 | 5/1979 | Kaczmarek et al. | 55/502 |

OTHER PUBLICATIONS

Millipore Catalog MC/1, Millipore Corp., Bedford, Massachusetts, 1970, Holder Models 3A650 and 3A700.
Perry's Chemical Eng. Handbook, 5th Ed. 1973, pp. 6-60 to 6-63.
"Membrane Ultrafiltration," Porter et al., Chem. Tech., Jan. 1971, pp. 56-63.
"Micronomic Filtration," Millipore Corporation, Bedford Mass., 1972.

*Primary Examiner*—Benoît Castel
*Assistant Examiner*—David R. Sadowski
*Attorney, Agent, or Firm*—William C. Babcock

[57] ABSTRACT

A filter holding assembly capable of being used to filter pressurized fluid from a source of the latter, with the assembly capable of being dismantled without the use of hand tools to occupy a minimum of space, and the assembly likewise capable of being transformed without the use of hand tools to a unit in which first and second mating plates support a large diameter filter membrane in a position to be subjected to the pressurized fluid. Particulates in the fluid above a predetermined size are deposited on the membrane, with the balance of the fluid discharging as a filtrate from the assembly. The first and second plates when in mating engagement define a centered confined space in which the membrane and a supporting screen are disposed, and the membrane having the peripheral edge portion thereof in sealing contact with a compressed resilient ring to prevent the pressurized fluid in the centered confined space by-passing the membrane. The filter assembly is particularly adapted for use with a second filter assembly that is supported therefrom, with the large diameter first membrane effecting a primary filtration in which particulates above a predetermined size are removed from the fluid, and the resulting filtrate when subjected to a finer filtration by the second assembly to remove particulates above a predetermined size that have passed through the first membrane.

5 Claims, 6 Drawing Figures

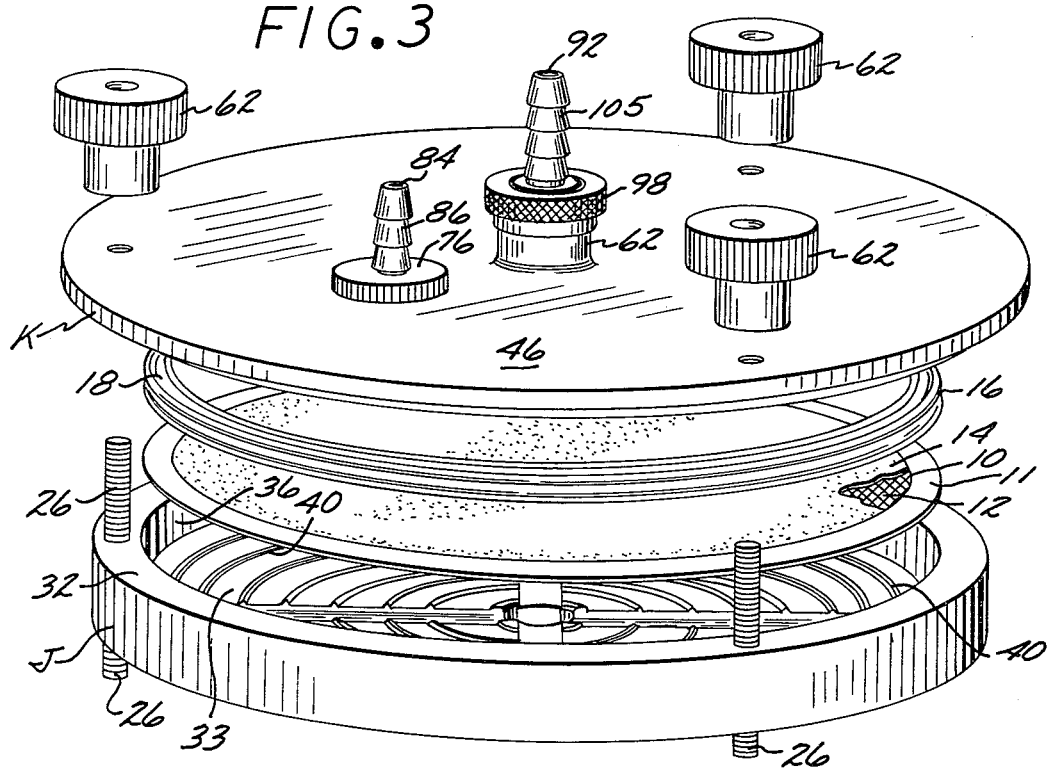
FIG. 3
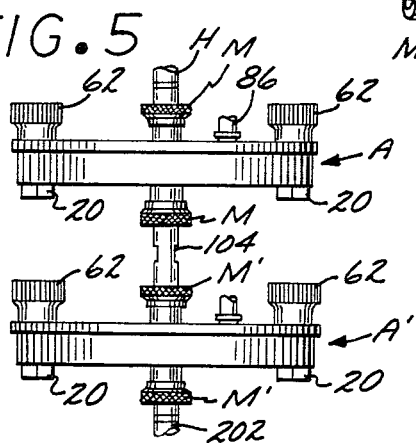
FIG. 4
FIG. 5
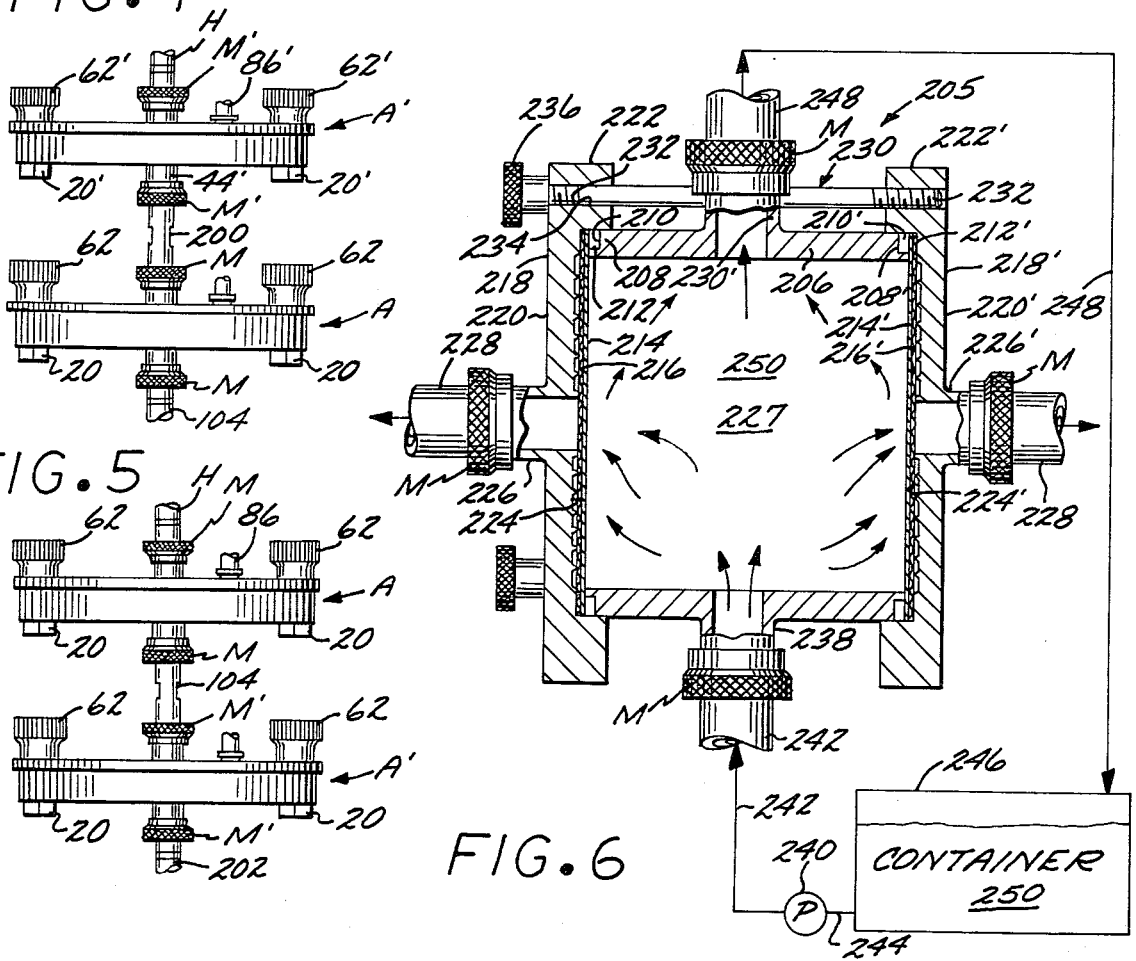
FIG. 6

FILTER HOLDING ASSEMBLY

BACKGROUND OF THE INVENTION

1. Field of the Invention
Filter Holding Assembly.

2. Description of the Prior Art

In the medical and pharmaceutical fields the rapid and efficient filtering of fluids in volume is a problem of major concern. Frequently viscous solutions, cultures and serums and other fluids must be filtered to remove particulates including bacteria therefrom. Obviously, to filter such fluids within a reasonable length of time a large diameter membrane must be used, and the time for the filtering operation being lessened by the use of either pressure or a vacuum to increase the rate at which filtrate passes through the membrane.

A major object of the present invention is to provide a first filter holding assembly that may be used as such for a single stage filtration operation, or in cooperation with a secured filter holding assembly provide a two stage filtration of a fluid, with the first stage filtration being achieved by the use of a relatively large diameter membrane that removes first particulates above a first predetermined size from the fluid, and the second stage employing a membrane of finer porosity than the first membrane to remove second particulates of less that the first predetermined size from the filtrate that has passed through the first membrane.

Another object of the present invention is to provide a filter holder in which the filter membrane rests on a screen that is supported on a grooved bottom plate that forms a part of a cavity in which the membrane is so disposed as to effectively utilize a greater area of the membrane than possible with prior art filter holders, with the seal around the periphery of the membrane being outwardly from the cavity and effected by a single sealing ring, and the filter holder being sanitary in that there are no internal threads therein nor does the making up of the filter holder into a filtering form require the torquing of nuts.

Yet another object of the present invention is to provide a filter assembly that has a simple mechanical structure, is simple and easy to use, and one that permits the efficient and rapid filtering of fluids of high viscosity.

SUMMARY OF THE INVENTION

The present filter holder assembly is particularly adapted for use with a source of pressurized fluid that is to be filtered. The filter assembly is capable of supporting a first circular membrane through which the pressurized fluid is forced, with the membrane preventing particulates above a first predetermined size passing therethrough with the filtrate from the fluid. The filter holding assembly includes a circular supporting screen, a circular membrane of substantially the same diameter as the screen and upper and lower rigid, circular, horizontally positionable mating plates that cooperate when in abutting contact to define a ring-shaped confined space and a center confined space. The surface of the lower plate that partially defines the center confined space has a number of spaced grooves defined therein that communicate with a first transverse center bore in the lower plate that is axially aligned with a second transverse bore in the upper plate, and the first and second bores in communication with first and second externally threaded tubular bosses that extend outwardly from the lower and upper plates in opposite directions.

The interior of the first and second bosses are in communication with the first and second bores. The upper and lower plates when in mating engagement define a centered confined space of such size as to slidably receive the screen that is supported therein on the surface of the lower plate in which the grooves are defined, and the membrane resting on the screen in the centered confined space. The lower plate has a number of tapped, circumferentially spaced transverse bores defined therein outwardly from the centered confined space with each tapped bore supporting a stud bolt that projects downwardly and upwardly from the lower plate and the stud bolts axially aligned with a number of transverse bores in the upper plate through which the stud bolts extend when the plates are in mating engagement.

A number of rigid legs are provided, each of which legs have first threaded upper ends and second lower ends. A number of elongate nuts are provided. Each of the nuts is capable of concurrently engaging one of the downwardly extending portion of a stud bolt and a first threaded upper end of a leg, and the legs when so engaged by the nuts serving to support the first and second plates in mating engagement at a desired elevation above a horizontal surface on which second ends of the legs rest.

A resilient ring is provided that is removably disposed in the ring-shaped confined space, with the sealing ring resting on a peripheral edge portion of the membrane, and the sealing ring of sufficient depth as to be compressed and forced into sealing engagement with the membrane when the first and second plates are in full mating engagement. Due to this seal between the membrane and the sealing ring pressurized fluid in the center confined space is prevented from flowing around peripheral edges of the membrane and screen into the grooves and in effect bypassing the membrane.

A number of quick-release nuts are provided that threadably engage the portions of the stud bolts projecting above the upper plates, with the nuts when tightened forcing the upper and lower plates into full mating engagement. A tube or hose is removably connected to the second boss and extends to the source of pressurized fluid, to permit the pressurized fluid to flow into the center confined space to be filtered and the filtrate after discharge through the membrane flowing into the grooves to subsequently discharge through the first bore and the first boss. The filtrate as it discharges from the first boss either flows into a hose to be conducted to a desired destination, or a receptacle may be disposed under the first boss to receive the filtrate discharging therefrom. The upper plate has a valve operatively associated therewith for bleeding out air present within the invention.

The stud bolts serve three distinct functions. First, they prevent relative rotation of the first and second plates relative to one another when the plates are in mating engagement. Second, in cooperation with the nuts and legs support the first and second plates at a desired elevation above a horizontal supporting surface. Third, in cooperation with a number of quick release nuts they hold the first and second plates in fixed mating engagement to permit pressurized filtration of the fluid. A second filter holding assembly is provided that may removably engage the first externally threaded boss, with the second assembly supporting a second membrane of more dense structure than the first membrane, and the second membrane removing particulate from the first filtrate that have passed through the first membrane. The invention also embodies the use of quick disconnect fittings of a novel design.

BRIEF DESCRIPTION OF THE DRAWINGS

FIG. 3 is an exploded perspective view of the first and second plates, the quick-release nut, and the supporting screen, the membrane, and resilient ring that comprise the upper portion of the first filter holding assembly;

FIG. 4 is a side elevational view of a second filter holding assembly disposed ahead of the invention to provide pre-filtering of the liquid;

FIG. 5 is a side elevational view of a second filter holding assembly operatively associated with the invention to provide post filtering of the liquid; and FIG. 6 is a transverse cross-sectional view of an alternate form of filter holding assembly in which the liquid moves transversely across the filter membranes to minimize the build up of layers of particulates thereon, as well as double the effective filtration area.

DESCRIPTION OF THE PREFERRED EMBODIMENTS

Figure 1:
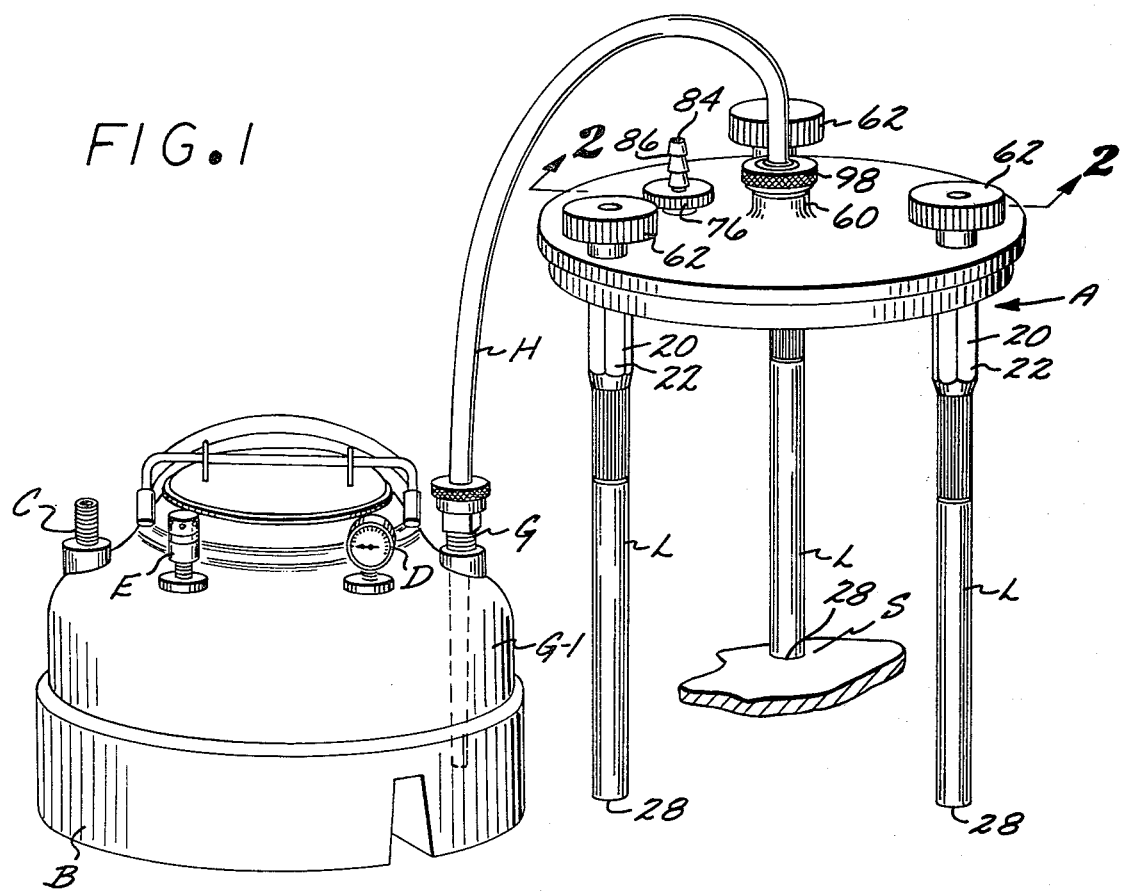
FIG. 1 is a perspective view of a fluid pressurizing vessel that supplies fluid to be filtered to the first filter holding assembly.

The first filter holding assembly A as may be seen in FIG. 1 is preferably used in conjunction with a pressure vessel B that has a pressurized gas inlet C, a pressure gauge D, and pressure release valve E. Pressurized inert gas is supplied to the interior of assembly C through a tube (not shown) connected to inlet C. The pressure vessel B includes a fitting G that has a tube G-1 that extends downwardly into the interior of the vessel B adjacent the bottom thereof, with the fitting G being connected to a pliable tube or hose H through which the fluid to be filtered is discharged due to the pressurization of the interior of the vessel B by the inert gas previously mentioned. The first filter holding assembly A includes a circular supporting screen 10 that is preferably provided with a metal rim 11, and the screen being covered with a porous fibrous material 12 such as cellulose acetate or the like. The screen 10 has a filtering membrane 14 of substantially the same diameter resting on the upper surface thereof, and the peripheral upper edge surface of the membrane being engaged by a resilient sealing ring 16. The resilient sealing ring 16 is illustrated in FIG. 2 as being rectangular in has; transverse cross section and having circumferentially extending grooves 18 in the sides thereof.

Figure 2:
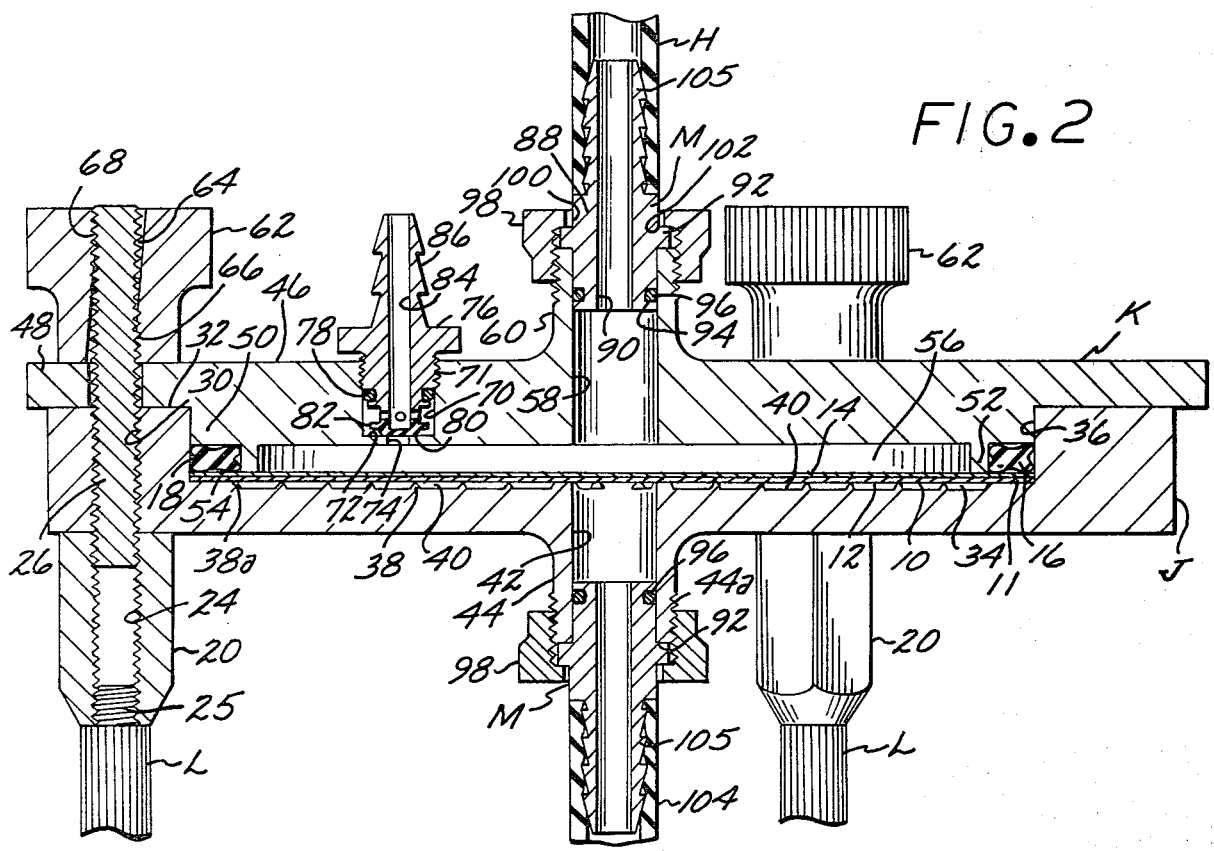
FIG. 2 is a transverse cross-sectional view of the upper portion of the first filter holding assembly taken along the line 2—2 thereof.

The first filter holding assembly A as best seen in FIGS. 1 and 2 includes a rigid upper circular plate K and a lower circular plate J that mates with the upper plate when disposed as shown in FIG. 2. The lower circular plate J and upper plate K when in mating engagement are held at a desired elevation above a horizontal surface by a number of circumferentially spaced upwardly extending legs L.

The lower plate J as can best be seen in FIGS. 1 and 2 has a number of outwardly disposed circumferentially spaced tapped bores 30 formed therein, in which the center portion of each stud bolt 26 is disposed, with each stud bolt having a portion that projects upwardly above the lower plate J and another portion that extends downwardly therebelow. A number of elongate nuts 20 are provided, each of which nuts has a number of circumferentially spaced flat surfaces 22 on the exterior thereof and a tapped bore 24 extending longitudinally through the nut. Each leg has an externally threaded upper end portion 25 and a lower end 28. The nuts 20, as best seen in FIG. 2, may be placed in engagement with the downwardly extending portions of stud bolts 26 and the upper threaded end portions 25 of legs L without the use of hand tools, for the nuts 20, stud bolts 26, and legs L to cooperate to support the lower plate L at an elevated position above a horizontal surface S. The lower plate J has a first surface 32 as may be seen in FIG. 2 from which a centered cavity 34 extends downwardly into the plate, with the cavity being defined by a cylindrical side wall 36, and a flat bottom 38 in which a number of spaced grooves 40 are defined. The grooves 40 preferably extend circumferentially and radially and are in communication with a first centered transverse bore 42. The bore 42 is in communication with a downwardly extending first tubular boss 44 that has threads 44a formed on the exterior surface thereof.

Upper plate K has a first upper surface 46 and second lower surface 48, and a centered protuberance 50 that projects downwardly from the second surface 48. Protuberance 50 is of such transverse cross-section as to be slidably and snugly received within the cavity 34. A ring-shaped rib 52 projects downwardly from the lower extremity of the protuberance 50 and in cooperation with the cavity 34 defines a ring-shaped confined space 54 and a central confined space 56. The central confined space 56 is in communication with a centered upwardly extending transverse bore 58 that is in communication with a second tubular boss 60 that extends upwardly from the second plate and has threads formed on the upper exterior surface thereof.

A number of quick-release nuts 62 are provided, each of which nuts are of the type that include an angled bore 64 that has oppositely disposed semi-circular threads 66 and 68 formed on the upper and lower portions thereof. Each of the nuts 62 due to the above-described structure may be dropped downwardly on the upwardly projecting portion of one of the stud bolts 26, and then by merely a half or three quarters turn be forced into pressure contact with the surface 46 of the upper plate K.

A tapped recess 70 projects downwardly into the upper plate K from the surface 46 thereof, and the recess on the lower end thereof developing into a valve seat 72, which is in communication with a transverse bore 74 that communicates with the center confined space 56. An elongate externally threaded valve body 76 is provided that has an O-ring 78 mounted in a recess therein, and the lower end of the valve body having a resilient cap 80 mounted thereon. A transverse bore 82 is formed in the valve body 76 upwardly from the cap 80 and is in communication with a longitudinal bore 84 formed in the valve body 76. The upper portion of the valve body 76 is serrated to define a hose engageable portion 86. When the valve body 76 is screwed downwardly as shown in FIG. 2, the resilient cap 80 is in sealing engagement with the valve seat 72. However, when the valve body 76 is rotated in an opposite direction to move the cap 80 upwardly relative to the valve seat 72, air that is trapped in the central confined space 56 at the initiation of a filtering operation may flow upwardly into the valve body 76 through the transverse bore 82 and longitudinal bore 84. When liquid starts to discharge from bore 84, it is a signal that all air has been displaced from confined space 56 and valve body 76 is rotated to a closed position.

The hose H used in conducting pressurized fluid to the first filter holding assembly A is connected to the second tubular boss 60 by a fitting M. The fitting M includes an elongate body 88 that has a longitudinal bore 90 extending therethrough, and a collar 92 extending outwardly from the elongate body as shown in FIG. 2. A circumferential recess 94 is formed in the elongate body 88 below the collar 92 and supports a sealing ring 96 which is in sealing contact with the interior surface of the second tubular boss 60. A nut 98 is provided that has a centered opening 100 therein, which nut extends downwardly over the elongate body 88, and when the nut is rotated in an appropriate direction a circumferential lip 102 on the nut engages the collar 92 to hold the elongate body 88 in fluid sealing engagement with the second boss 60 as shown in FIG. 2. The upper exterior portion of the elongate body 88 is serrated and defines a portion that may be removably and sealingly connected to the interior end portion of the hose H. The nut 98 may be loosened from boss 60 without the use of hand tools. When nut 98 is loosened the valve body may be rotated relative to the boss 60 without disturbing the seal that is effected by the resilient ring 96 between the valve body and the cylindrical interior surface of the boss 60. By hand tightening the nut 98 the lip 102 pressure contacts the upper surface of collar 92, with the collar being frictionally gripped between the lip and the upper surface of boss 60, and the valve body 88 now held in a non rotatable position relative to boss 60.

The use and operation of the first filter holding assembly A is extremely simple. The valve body 76 is initially rotated to allow the escape of air from the interior of the hose H and the confined space 56. When the confined space 56 is filled with the fluid to be filtered from the pressure vessel B, the valve body 76 is rotated in an appropriate direction to force the resilient cap 80 into sealing engagement with valve seat 72. Quick release nuts 62 when tightened forces the upper plate K into full mating engagement with lower plate J. Resilient ring 16 is compressed and forced into sealing engagement with the peripheral surface of membrane 14, and the resilient ring preventing the flow of the fluid being filtered around the membrane 14 and screen 10 into the grooves 40. The lower peripheral surface of membrane 14 rests on the rim 11 of screen 10. The rim 11 rests on an outwardly disposed flat ring-shaped ledge 38a that forms a part of the bottom 38.

The pressure on fluid within the confined space 56 forces the fluid through the membrane 14 with particulates above a predetermined size being deposited on the upper surface thereof. The filtrate flows from the membrane 14 through grooves 40 into the bore 42 and first boss 44. The filtrate may be received from the first boss 44 in a suitable receptacle (not shown), or a fitting M of the structure previously described may be removably secured to the first boss 44 as shown in FIG. 2 and the fitting connected to a hose 104.

Should it be desired to pre-filter the fluid prior to its reaching the filter holding assembly A, a second filter holding assembly A' may be provided as shown in FIG. 4. Elements of filter holding assembly A' that are common to the assembly A are identified in FIG. 4 with the numeral and letters previously used but with primes added thereto. The second filter holding assembly A' has the upper fitment M' thereof connected to the tube H and receives unfiltered liquid therefrom. The lower fitment M' of second filter holding assembly A' are connected by a tubular member 200 to the upper fitment M of the first filter holding assembly A. Filtered fluid discharges from the lower fitment M of the filter holding assembly A to a tube 104 or receptacle (not shown).

Post filtering of fluid discharging from the first assembly A may be accomplished by the second filter assembly A' when the latter is disposed as shown in FIG. 5. The tube 104 extends from the lower fitment M to the upper fitment M' of filter holding assembly A'. After the fluid is post filtered in second filter holding assembly A' as shown in FIG. 5 the twice filtered fluid is discharged to a tubular member 202 connected to the lower fitment M' on the second filter holding assembly.

In the filtering of fluids V that have a high percentage of particulates 204 therein, the filter membrane may have a sufficiently thick layer of particulates deposited thereon that the flow of fluid therethrough is substantially impeded, and the filtering operation requiring an unduly long time.

An apparatus 205 that permits the efficient filtering of a liquid U is shown in FIG. 6. The apparatus 205 includes a rigid cylindrical shell 206 that has first and second end surfaces 208 and 208' in which first and second circular recesses 210 and 210' are defined. First and second recesses 210 and 210' have first and second resilient rings 212 and 212' disposed therein.

The first and second rings 212 and 212' abut against the peripheral edges of first and second filter membranes 214 and 214'. First and second membranes 214 and 214' abut against first and second circular screens 216 and 216' that are in contact with first and second end pieces 218 and 218'.

The first and second end pieces include first and second webs 220 and 220' that have first and second flanges 222 and 222' extending towards one another from the peripheral edge portions of the flanges. The interior surfaces of the first and second webs 220 and 220' have first and second circumferential and radially extending grooves 224 and 224' defined therein. First and second tubular bosses 226 and 226' extned outwardly from the first and second webs 220 and 220' and are in communication with a confined space 227 defined in apparatus 205. The first and second tubular bosses 226 and 226' have fitments M mounted thereon that are connected to first and second tubes 228 and 228'.

A number of circumferentially spaced rods 230 are provided that have first and second threaded end portions 232 and 232'. The first threaded end portions 232 engage second tapped bores 234' formed in the second flange 222' and extends through first bores 234 in first flange 222 that are not tapped. The first threaded end portions are engaged by quick release nuts 236, which nuts when tightened cooperate with the rods 230 and first and second flanges 222 and 222' to hold the invention 205 together as an integral unit.

Third and fourth diametrically aligned bosses 238 and 238' extend outwardly from shell 206 and are engaged by fitments M. A power driven pump 240 has the discharge thereof connected to a conduit 242 that extends to fitment M on third boss 238. A conduit 244 is connected to the suction side of pump 240 and extends to the interior of a container 246 that holds the liquid 250 to be filtered. A second conduit 248 extends from fitment M on fourth tubular boss 238' to the interior of container 246.

In operation the pump 240 tends to pump liquid 250 into the confined space 227 at a rate faster than it can escape therefrom through fourth tubular boss 238' to return to container 246. As a result the liquid 250 is pressurized and filtered liquid 250' flows through the first and second bosses 226 and 226' to the first and second tubes 228 and 228' for a desired use. Flow of unfiltered liquid 250 in confined space 227 that does not flow through first and second tubular bosses 226 and 226' is indicated by arrows in FIG. 6 and is transversely across first and second filter membranes 214 and 214'. Due to this transverse flow of the liquid 250 there is a minimum tendency of particulates (not shown) in liquid 250 to build up as layers on the first and second membranes 214 and 214'. The first and second membranes cooperate to double the effective filtering area of the invention.

The use and operation of the invention has been explained previously in detail and need not be repeated.

What is claimed is:

1. In combination with a resilient hose connected to a source of a fluid under substantial pressure that is to be filtered; a circular screen; a flat rim that extends around the periphery of said screen; a layer of porous material that covers said screen; a sheet of filtering membrane that is of substantially the same diameter as said rim and overlies the same; a resilient sealing ring of generally rectangular transverse cross section that rests on a peripheral section of said filtering membrane above said rim; a filter holder that so supports said screen, filtering membrane and sealing ring in such a manner that all fluid discharging from said filter holder must have passed through said filtering membrane, with said filter holder capable of being assembled and taken apart for cleaning and the like without the use of hand tools, said filter holder including:

a. a lower, circular, horizontally positionable rigid plate that has upper and lower horizontal surfaces, at least three circumferentially spaced, transverse tapped bores that extend vertically through an outer peripheral portion of said lower plate, a centered cavity that extends downwardly in said lower plate from said upper surface to terminate in a flat horizontal bottom that includes a flat ring-shaped ledge and a plurality of spaced grooves within the confines of said ledge that communicate with a first downwardly extending vertical bore, and a first tubular boss that depends from said lower plate and communicates with said first bore, said cavity of slightly greater diameter than said rim to permit said rim to rest on said ledge, said filtering membrane to rest on said screen and overlie said rim, and said resilient sealing ring to rest on the peripheral portion of said filtering membrane directly above said rim;

b. a plurality of stud bolts that engage said tapped bores and have upper and lower portions that extend above and below said upper and lower horizontal surfaces;

c. a plurality of legs, each of said legs having an upper threaded end portion and a lower end;

d. a plurality of elongate hand tightenable nuts that removably engage said lower portion of said stud bolts and said upper threaded end portions of said legs to support said lower horizontal plate at an elevated position above a horizontal surface on which said lower ends of said legs rest;

e. an upper, circular, horizontal plate that has upper and lower surfaces, a plurality of circumferentially spaced transverse bores that have said upper portions of said stud bolts extending upwardly therethrough, a circular protuberance that depends from said lower surface of said upper plate to mate with said cavity, a circular rib disposed inwardly from the peripheral edge of said protuberance and depending therefrom to divide said cavity into a centered confined space and a ring shaped confined space, a second tubular boss that extends upwardly from said upper plate and that is in communication with a second transverse bore in said upper plate and protuberance that extends to said centered confined space, said ring shaped confined space of slightly greater width than said resilient sealing ring, said rib of a lesser depth than that of said resilient sealing ring, and said upper horizontal plate having a third bore therein adjacent said second bore, said third bore having threads therein, and said second tubular boss having external threads thereon;

f. a plurality of hand tightenable quick release nuts that engage said upper portions of said stud bolts above said upper horizontal plate, said quick release nuts when tightened forcing said upper plate towards said lower plate to compress said sealing ring into pressure sealing engagement with said membrane, said rib, and the portion of said upper plate that defines said ring shaped confined space;

g. hand operable valve means for permitting the discharge of air from said centered confined space at the initiation of the filtering operation, said valve means including:

1. an elongate valve body that has upper and lower ends between which a longitudinal bore extends, a transverse bore in said valve body upwardly disposed from said lower end, a circumferential groove in said valve body upwardly from said transverse bore, external threads on said valve body upwardly from said groove, said external threads on said valve body engaging said threads in said upper portion of said third bore, and hose engageable portion of said valve body adjacent said upper end;

2. a resilient cap on said lower end of said valve body; and 3. a resilient ring in said groove that sealingly engages said recess below said threads therein, said third bore and longitudinal bore being out of communication when said resilient cap is in sealing contact with said valve seat, but said third bore being in communication with said longitudinal bore through said transverse bore when said valve body is rotated to a position where said resilient cap is separated from said valve seat;

h. hand securable, angularly adjustable fitment means that removably and sealingly connect the free end of said pliable tube to said second tubular boss for said pressurized fluid to flow to said centered confined space, with said first particulates remaining on said first membrane, and filtrate from said fluid flowing through said membrane and screen to said centered confined space and thereafter through said grooves, first transverse bore and said first boss, with said fitment means including:

1. an elongate rigid body that has upper and lower ends, a longitudinal bore that extends between said upper and lower ends, a circumferential groove in said body upwardly from said lower end, a collar that extends outwardly from said body and is upwardly disposed relative to said groove, and hose engageable means on said body adjacent said upper end;

2. a resilient ring disposed in said groove, said resilient ring sealingly engaging the interior surface of said second boss when the portion of said body below said collar is disposed within said second boss; and 3. a nut that encircles said body and is in engagement with said threads on said second boss, said nut when tightened forcing said collar into frictional engagement with the upper extremity of said second boss whereby said body cannot rotate relative to said second boss, but said nut when loosened on said threads on said tubular boss permitting said body to be rotated without said resilient ring in said groove on said body coming out of sealing engagement with said interior surface of said second boss.

2. A first filter holder assembly as defined in claim 1 and in addition a second filter holder assembly of the same structure, said second tubular boss of said second filter holder assembly connected to said hose, and in addition:

k. conduit means that connect said first tubular boss of said first filter holder assembly to said second tubular boss of said second filter holder assembly, and said liquid being subjected to pre-filtering and filtering when it discharges from said first tubular boss of said first filter assembly.

3. A first filter holder assembly as defined in claim 1 and in addition a second filter holder assembly of the same structure, and in addition:

k. conduit means that connect said first tubular boss of said first filter holder assembly to said second tubular boss of said second filter holder assembly, and said liquid being subjected to filtering and post filtering when it discharges from said first tubular boss of said second filter holder assembly.

4. A filter assembly that includes:

a. a pair of laterally spaced first and second end pieces that include first and second webs and first and second circular flanges on said first and second circular webs that extend towards one another, said first and second webs on the adjacent faces thereof within said first and second flanges having a plurality of circumferential and radial grooves defined therein, and first and second tubular bosses that extend outwardly from said first and second webs and communicate with said grooves on said adjacent faces of said first and second webs;

b. first and second circular screens that abut against said faces of said first and second webs in which said grooves are defined;

c. first and second filter membranes that abut against said first and second screens;

d. a cylindrical shell that has first and second circular end surfaces in which first and second circular recesses are defined, said shell including third and fourth tubular bosses that are diametrically disposed and communicate with the interior of said shell;

e. first and second resilient rings supported in said first and second recesses;

f. first means for maintaining said first and second end pieces in pressure contact with said first and second resilient rings to effect a liquid tight seal between said first and second end pieces and said cylindrical shell; and g. second means for discharging a liquid containing particulates through said third tubular boss into the interior of said cylindrical shell at a rate that tends to be faster than the rate at which it may flow from said fourth tubular boss to develop an elevated pressure within said cylindrical shell that results in liquid free of said particulates flowing from said first and second tubular bosses, and particulates deposited on said first and second membranes being continuously removed therefrom as at least a portion of said liquid within said cylindrical shell sweeps transversely across said first and second membranes in flowing from said third to said fourth tubular boss.

5. A filter assembly as defined in claim 4 in which said first and second membranes are of substantially the same size and cooperate to double the effective filter area of the filter assembly.

* * * * *